US012244008B2

(12) United States Patent
Horikawa et al.

(10) Patent No.: US 12,244,008 B2
(45) Date of Patent: Mar. 4, 2025

(54) POSITIVE ELECTRODE MATERIAL OF SECONDARY BATTERY, AND SECONDARY BATTERY USING SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Yuji Yamamoto, Toyota (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 182 days.

(21) Appl. No.: 16/890,441

(22) Filed: Jun. 2, 2020

(65) Prior Publication Data
US 2020/0388840 A1 Dec. 10, 2020

(30) Foreign Application Priority Data
Jun. 6, 2019 (JP) .................................. 2019-106059

(51) Int. Cl.
*H01M 4/485* (2010.01)
*H01M 4/131* (2010.01)
(Continued)

(52) U.S. Cl.
CPC ........... *H01M 4/485* (2013.01); *H01M 4/131* (2013.01); *H01M 4/366* (2013.01);
(Continued)

(58) Field of Classification Search
CPC ...... H01M 4/485; H01M 4/131; H01M 4/366; H01M 10/0525; H01M 2004/021;
(Continued)

(56) References Cited

U.S. PATENT DOCUMENTS

| 6,395,426 B1 * | 5/2002 | Imachi .............. H01M 10/0565 429/231.3 |
| 2008/0131780 A1 * | 6/2008 | Kawasato ............. H01M 4/525 429/231.95 |
| 2011/0033749 A1 | 2/2011 | Uchida et al. |

FOREIGN PATENT DOCUMENTS

| CN | 1253389 A | 5/2000 |
| CN | 101208269 A | 6/2008 |

(Continued)

*Primary Examiner* — Cynthia K Walls
(74) *Attorney, Agent, or Firm* — Oliff PLC

(57) ABSTRACT

Provided is a positive electrode material which can impart a secondary battery with excellent low temperature output characteristics, excellent high temperature cycle characteristics and excellent durability against high voltage. A positive electrode material of a secondary battery disclosed here includes a positive electrode active substance particle and a coating containing a titanium-containing compound at the surface of the positive electrode active substance particle. A layer having a higher Ti concentration than the Ti concentration at a depth of 500 nm from the surface is formed in a surface portion of the positive electrode active substance particle. The titanium-containing compound in the coating is at least one compound selected from the group consisting of $TiO_2$, $Ti_nO_{2n-1}$, wherein n is an integer of 3 or more, and oxides containing Li and Ti.

4 Claims, 3 Drawing Sheets

(51) Int. Cl.
*H01M 4/36* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01); *H01M 2004/028* (2013.01)

(58) Field of Classification Search
CPC ..... H01M 2004/027; H01M 2004/028; H01M 2220/20; H01M 4/525; H01M 4/628; H01M 4/505; Y02E 60/10
See application file for complete search history.

(56) References Cited

FOREIGN PATENT DOCUMENTS

| | | |
|---|---|---|
| CN | 101675547 A | 3/2010 |
| JP | 2004-103566 A | 4/2004 |
| JP | 2015-099646 A | 5/2015 |
| WO | 2009/057722 A1 | 5/2009 |

\* cited by examiner

POSITIVE ELECTRODE MATERIAL OF SECONDARY BATTERY, AND SECONDARY BATTERY USING SAME

BACKGROUND OF THE INVENTION

1. Field of the Invention

The present disclosure relates to a positive electrode material of a secondary battery. The present disclosure also relates to a secondary battery using the positive electrode material. It should be noted that this application claims priority on the basis of Japanese Patent Application No. 2019-106059, which was filed on Jun. 6, 2019, and the entire contents of that application are incorporated by reference in this specification.

2. Description of the Related Art

In recent years, secondary batteries such as lithium secondary batteries have been advantageously used as portable power sources for personal computers, handheld devices, and the like, and as motive power sources for vehicles such as electric vehicles (EV), hybrid vehicles (HV) and plug-in hybrid vehicles (PHV).

As secondary batteries such as lithium secondary batteries have become more widespread, there have been demands for higher performance. In general, positive electrode active substances able to store and release lithium ions are used in positive electrodes of lithium secondary batteries. Use of positive electrode materials obtained by coating the surface of a positive electrode active substance particle with a titanium-containing compound is known as a technique for improving the performance of lithium secondary batteries (for example, see Japanese Patent Application Publication Nos. 2015-099646 and 2004-103566).

SUMMARY OF THE INVENTION

As a result of diligent research, the inventors of the present disclosure found that secondary batteries obtained using conventional positive electrode materials exhibit increased resistance at low temperatures and are insufficient in terms of low temperature output characteristics. In addition, it was found that in cases where such secondary batteries are repeatedly charged and discharged at high temperatures, there is a significant deterioration in capacity and high temperature cycle characteristics are insufficient. Furthermore, it was found that such secondary batteries exhibit increased resistance when operated at high voltages and are insufficient in terms of durability against high voltage.

Therefore, it is an object of the present disclosure to provide a positive electrode material which can impart a secondary battery with excellent low temperature output characteristics, excellent high temperature cycle characteristics and excellent durability against high voltage.

A positive electrode material of a secondary battery disclosed here includes a positive electrode active substance particle and a coating containing a titanium-containing compound at a surface of the positive electrode active substance particle. A layer having a higher Ti concentration than a Ti concentration at a depth of 500 nm from the surface is formed in a surface portion of the positive electrode active substance particle. The titanium-containing compound in the coating is at least one compound selected from the group consisting of $TiO_2$, $Ti_nO_{2n-1}$, wherein n is an integer of 3 or more, and oxides containing Li and Ti.

Provided by such a configuration is a positive electrode material which can impart a secondary battery with excellent low temperature output characteristics, excellent high temperature cycle characteristics and excellent durability against high voltage.

In a desired aspect of the positive electrode material of a secondary battery disclosed here, the layer having the higher Ti concentration has a thickness of at least 0.5 nm and at most 100 nm.

According to such a configuration, the effects of improving low temperature output characteristics, improving high temperature cycle characteristics and improving durability against high voltage are particularly enhanced.

In a desired aspect of the positive electrode material of a secondary battery disclosed here, a total amount of Ti contained in the titanium-containing compound of the coating and Ti contained in the layer having the higher Ti concentration is at least 0.01 mass % and at most 15 mass % relative to a mass of the positive electrode active substance particle.

According to such a configuration, the effects of improving low temperature output characteristics, improving high temperature cycle characteristics and improving durability against high voltage are particularly enhanced.

A secondary battery disclosed here includes a positive electrode, a negative electrode and an electrolyte, wherein the positive electrode contains the positive electrode material mentioned above.

According to such a configuration, the secondary battery exhibits excellent low temperature output characteristics, excellent high temperature cycle characteristics and excellent durability against high voltage.

DESCRIPTION OF THE PREFERRED EMBODIMENTS

Figure 1:
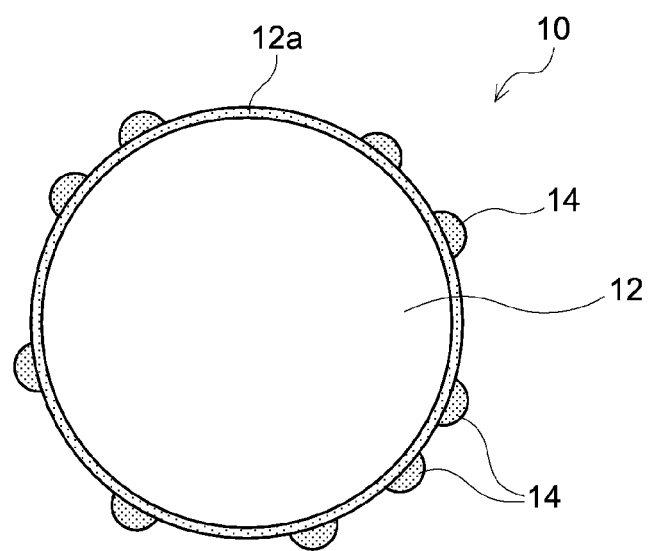
FIG. 1 is a schematic cross-sectional view showing an example of a positive electrode material according to one embodiment of the present disclosure.

Hereinafter, an embodiment according to the present disclosure will be described. It should be noted that matters (for example, general configurations of the positive electrode material of a secondary battery which do not characterize the present disclosure) other than the matter specifically set forth in the present specification and that may be necessary for carrying out the present disclosure may be comprehended as design matters for a person with ordinary skill in the art on the basis of prior art in the relevant field. The present disclosure can be carried out on the basis of the disclosure in the present specification and common general technical knowledge in the relevant field. In the drawings below, members and portions that elicit identical effects are denoted with identical reference numerals. The dimensional relationships (length, width, thickness and so forth) in the figures do not necessarily reflect actual dimensional relationships.

It should be noted that, the term "secondary battery" in the present specification means electricity storage devices in general that can be repeatedly charged and discharged, and is a term that encompasses so-called storage batteries and electricity storage elements such as electrical double layer capacitors.

In addition, the term "lithium secondary battery" in the present specification means a secondary battery in which lithium ions are used as charge carriers and charging and discharging are effected by means of charge transfer involving lithium ions between positive and negative electrodes.

The positive electrode material of a secondary battery according to the present embodiment includes a positive electrode active substance particle and a coating containing a titanium-containing compound at a surface of the positive electrode active substance particle. A layer having a higher Ti concentration than a Ti concentration at a depth of 500 nm from the surface is formed in a surface portion of the positive electrode active substance particle.

A publicly known positive electrode active substance used in a secondary battery (particularly, a lithium secondary battery) may be used as the positive electrode active substance contained in the positive electrode material according to the present embodiment. Specifically, it is possible to use, for example, a lithium composite oxide, a lithium-transition metal phosphate compound, or the like. The crystal structure of the positive electrode active substance is not particularly limited, and may be a layered structure, a spinel structure, an olivine structure, or the like.

A lithium-transition metal composite oxide containing at least one of Ni, Co and Mn as a transition metal element is desired as the lithium composite oxide, and specific examples thereof include lithium-nickel-based composite oxides, lithium-cobalt-based composite oxides, lithium-manganese-based composite oxides, lithium-nickel-manganese-based composite oxides, lithium-nickel-cobalt-manganese-based composite oxides, lithium-nickel-cobalt-aluminum-based composite oxides and lithium-iron-nickel-manganese-based composite oxides.

From the perspective of low initial resistance, the lithium composite oxide desirably has a layered structure, and a lithium-nickel-cobalt-manganese-based composite oxide having a layered structure is more desired.

It should be noted that in the present specification, "lithium-nickel-cobalt-manganese-based composite oxide" is a term that encompasses not only oxides containing Li, Ni, Co, Mn and O as constituent elements, but also oxides containing one or two or more additional elements in addition to these elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. The same also applies to the lithium-nickel-based composite oxides, lithium-cobalt-based composite oxides, lithium-manganese-based composite oxides, lithium-nickel-manganese-based composite oxides, lithium-nickel-cobalt-aluminum-based composite oxides and lithium-iron-nickel-manganese-based composite oxides mentioned above.

An oxide having a composition represented by formula (I) below is desired as the lithium-nickel-cobalt-manganese-based composite oxide.

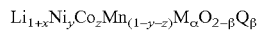     Formula (I):

In Formula (I), the values of x, y, z, α and β satisfy the inequalities 0≤x≤0.7, 0.1<y<0.9, 0.1<z<0.4, 0≤α≤0.1, and 0≤β≤0.5. M is at least one element selected from the group consisting of Zr, Mo, W, Mg, Ca, Na, Fe, Cr, Zn, Si, Sn and Al. Q is at least one element selected from the group consisting of F, Cl and Br. From the perspectives of energy density and thermal stability, it is desirable for y and z to satisfy the inequalities 0.3≤y≤0.5 and 0.20≤z<0.4.

Examples of lithium-transition metal phosphate compounds include lithium iron phosphate (LiFePO$_4$), lithium manganese phosphate (LiMnPO$_4$) and lithium iron manganese phosphate.

The shape of the positive electrode active substance particle is not particularly limited, and can be spherical, plate-like, needle-shaped, irregular-shaped, or the like. In addition, positive electrode active substance particles may be in the form of secondary particles caused by aggregation of primary particles, and may also be in the form of hollow particles.

The average particle diameter ($D_{50}$) of positive electrode active substance particles is not particularly limited, but is, for example, at least 1 μm and at most 20 μm, desirably at least 1.5 μm and at most 15 μm, and more desirably at least 3 μm and at most 15 μm.

It should be noted that the average particle diameter ($D_{50}$) of positive electrode active substance particles can be determined by means of, for example, a laser diffraction scattering method or the like.

A layer (also referred to as a "Ti-concentrated layer" hereinafter) having a higher Ti concentration than a Ti concentration at a depth of 500 nm from the surface is formed in a surface portion of the positive electrode active substance particle. The Ti-concentrated layer is generally formed in the entire surface of the positive electrode active substance particle (and particularly a primary particle) (that is to say, the whole of the surface portion of the positive electrode active substance particle is the Ti-concentrated layer), but the Ti-concentrated layer may be formed in a part of a surface portion of the positive electrode active substance particle. The thickness of the Ti-concentrated layer is less than 500 nm, because the Ti concentration at a depth of 500 nm from the surface is used as a basis. From the perspective of further enhancing the effects of improving low temperature output characteristics, improving high temperature cycle characteristics and improving durability against high voltage, the thickness of the Ti-concentrated layer is desirably at least 0.3 nm and at most 150 nm, and more desirably at least 0.5 nm and at most 100 nm.

It should be noted that the thickness of the Ti-concentrated layer can be determined by, for example, observing a cross section of the positive electrode material with an electron microscope.

In the present embodiment, the titanium-containing compound contained in the coating is at least one compound selected from the group consisting of TiO$_2$, Ti$_n$O$_{2n-1}$, wherein n is an integer of 3 or more, and oxides containing Li and Ti.

The value of n in Ti$_n$O$_{2n-1}$ is not particularly limited as long as this is an integer of 3 or more, but the value of n is desirably an integer of at least 3 and at most 9, and more desirably an integer of at least 3 and at most 5. That is to say, Ti$_n$O$_{2n-1}$ is more desirably Ti$_3$O$_5$, Ti$_4$O$_7$ or Ti$_5$O$_9$.

The ratio of the number of atoms of Li relative to the number of atoms of Ti (Li/Ti) in an oxide containing Li and Ti (that is to say, a lithium-titanium composite oxide or lithium titanate) is not particularly limited, but is desirably at least 0.1 and at most 3.

It should be noted that methods for synthesizing lithium-titanium composite oxides (or lithium titanates) having a variety of Li and Ti atom number ratios are publicly known. In addition, the ratio of the number of atoms of Li relative to the number of atoms of Ti can be adjusted by subjecting at least two types of compound selected from the group consisting of a titanium oxide, a lithium oxide and a lithium-titanium composite oxide to a mechanochemical treatment for compounding, at a prescribed mixing ratio.

From the perspective of further enhancing the effects of improving low temperature output characteristics, improving high temperature cycle characteristics and improving durability against high voltage, the coating desirably contains, as titanium-containing compounds, an oxide containing Li and Ti and at least one of $Ti_2$ and $Ti_nO_{2n-1}$.

The thickness of the coating is not particularly limited and is, for example, at least 0.1 nm and at most 100 nm. The thickness of the coating can be determined by, for example, observing a cross section of the positive electrode material with an electron microscope.

In the present embodiment, the amount of Ti contained in the titanium-containing compound of the coating and the amount of Ti contained in the Ti-concentrated layer are not particularly limited. From the perspective of further enhancing the effects of improving low temperature output characteristics, improving high temperature cycle characteristics and improving durability against high voltage, the total amount of Ti contained in the titanium-containing compound of the coating and Ti contained in the Ti-concentrated layer is desirably at least 0.001 mass % and at most 25 mass %, and desirably at least 0.01 mass % and at most 15 mass %, relative to the mass of the positive electrode active substance particle.

It should be noted that the total amount of Ti contained in the titanium-containing compound of the coating and Ti contained in the Ti-concentrated layer can be determined by, for example, energy dispersive X-Ray spectroscopy (TEM-EXD).

FIG. 1 shows an example of a positive electrode material according to the present embodiment. FIG. 1 is a schematic cross-sectional view of a positive electrode material 10 according to this example. As shown in the drawing, a positive electrode active substance particle 12 includes a Ti-concentrated layer 12a in a surface portion of the particle. In addition, coatings 14 containing a titanium-containing compound are scattered at the surface of the positive electrode active substance particle 12. Therefore, the coatings 14 partially cover the surface of the positive electrode active substance particle 12.

In the example shown, the coating 14 is present in the form of islands (that is to say, scattered) at the surface of the positive electrode active substance particle 12, but the manner in which the coating 14 covers the surface of the positive electrode active substance particle 12 is not particularly limited. It is possible for the coating 14 to form a single layer and completely cover the surface of the positive electrode active substance particle 12. However, from the perspective of battery characteristics, it is desirable for the coating 14 to be scattered at the surface of the positive electrode active substance particle 12 and partially cover the positive electrode active substance particle 12.

As a result of the Ti-concentrated layer being formed in a surface portion of the positive electrode active substance particle and the coating of a titanium-containing compound being formed on the surface of the positive electrode active substance particle, as described above, it is possible to improve the low temperature output characteristics, high temperature cycle characteristics and durability against high voltage of a secondary battery. It is surmised that this is for the following reason.

When a secondary battery is operated at a low temperature, the mobility of Li carriers in a non-aqueous electrolyte solution or solid electrolyte decreases, there is a delay in Li carriers reaching the surface of a positive electrode active substance, and low temperature output therefore decreases. In the present embodiment, however, the Li carrier concentration increases specifically in regions of a non-aqueous electrolyte solution or solid electrolyte close to both the Ti-concentrated layer and the coatings on the positive electrode active substance particle. A region where the Li carrier concentration is high acts as a buffer, and it is possible to prevent a shortage of Li at the surface of the active substance, and therefore possible to prevent a decrease in low temperature output. In addition, in a normal situation, Ti in solid solution in a positive electrode active substance is hardly involved in redox reactions in the course of battery reactions, and therefore behaves as a resistance layer. However, the redox activity of the Ti-concentrated layer is improved by the coating, which leads to the Ti-concentrated layer becoming involved in battery reactions and enables a reduction in resistance.

In addition, in these regions where the Li carrier concentration is high, negatively charged oxygen ions and dissolved oxygen are concentrated at the same time. As a result, the apparent oxygen partial pressure or oxygen concentration increases at the surface of the positive electrode active substance, release of oxygen from the positive electrode active substance is suppressed and high temperature cycle characteristics are improved.

In addition, in cases where a secondary battery is operated at a high voltage (for example, 4.5 V or more), the crystal structure of a positive electrode active substance breaks down and the resistance of the battery increases. However, after a secondary battery obtained using the positive electrode material according to the present embodiment was operated at a high voltage, when the crystallinity thereof was confirmed by means of a transmission electron microscope, it was confirmed that the crystal structure was substantially maintained. Therefore, in the positive electrode material according to the present embodiment, breakdown of the crystal structure of the positive electrode active substance is prevented by the Ti-concentrated layer and the coatings, and an increase in battery resistance is prevented. In addition, in a normal situation, durability deteriorates as a result of elution of Ti from a positive electrode active substance, but in the present embodiment, elution of Ti from the Ti-concentrated layer is prevented. As a result, durability against high voltage is improved.

The positive electrode material according to the present embodiment can be produced in the following method, for example.

First, positive electrode active substance particles and a compound to be converted into a titanium oxide by firing (for example, a titanium alkoxide) are mixed and fired. In this way, a Ti-concentrated layer is formed in a positive electrode active substance particle.

Next, the positive electrode material can be produced by causing constituent materials of the coatings to adhere to the surface of a positive electrode active substance particle by a mechanochemical treatment, a barrel sputtering treatment, or the like.

The positive electrode material according to the present embodiment is for a secondary battery, and it is possible to construct a secondary battery in accordance with a publicly known method using the positive electrode material according to the present embodiment. The secondary battery is desirably a lithium secondary battery. Here, with reference to the drawings, an explanation will now be given of a specific example of a configuration of a lithium secondary battery provided with a positive electrode that contains the positive electrode material according to the present embodiment. It should be noted that such a lithium secondary battery is not limited to the example explained below.

Figure 2:
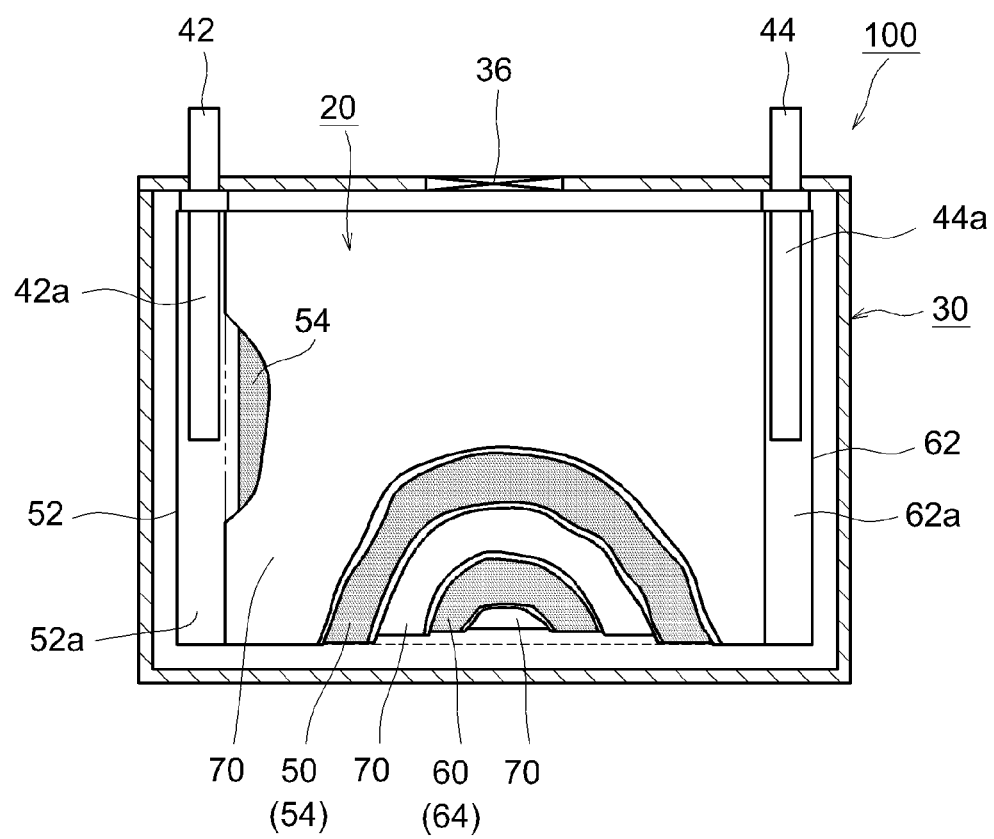
FIG. 2 is a cross-sectional view that schematically illustrates a configuration of a lithium secondary battery constructed using a positive electrode material according to one embodiment of the present disclosure.

A lithium secondary battery 100 shown in FIG. 2 is a sealed battery constructed by housing a flat wound electrode body 20 and a non-aqueous electrolyte solution (not shown) in a flat square battery case (that is to say, an outer container) 30. The battery case 30 is provided with a positive electrode terminal 42 and negative electrode terminal 44 for external connections, and a thin-walled safety valve 36, which is set to release the pressure inside the battery case 30 when this pressure reaches or exceeds a prescribed level. The positive and negative electrode terminals 42, 44 are electrically connected to positive and negative electrode current collector plates 42a, 44a, respectively. A metallic material which is lightweight and exhibits good thermal conductivity, such as aluminum, can be used as the constituent material of the battery case 30.

Figure 3:
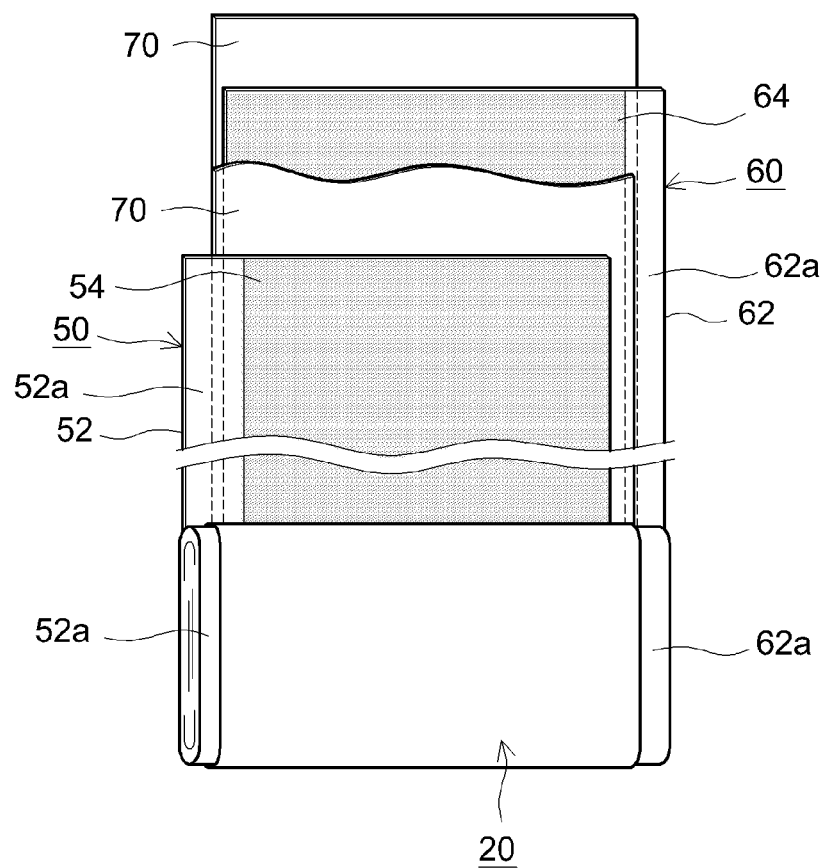
FIG. 3 is a cross-sectional view that schematically illustrates a configuration of a wound electrode body of a lithium secondary battery constructed using a positive electrode material according to one embodiment of the present disclosure.

As shown in FIG. 2 and FIG. 3, the wound electrode body 20 results from laminating a positive electrode sheet 50 in which a positive electrode active substance layer 54 is formed along the longitudinal direction, on one face or both faces (herein both faces) of an elongated positive electrode collector 52, and a negative electrode sheet 60 in which a negative electrode active substance layer 64 is formed along the longitudinal direction, on one face or both faces (herein both faces) of an elongated negative electrode collector 62, with two elongated separator sheets 70 interposed in between, and by winding then the resulting laminate in the longitudinal direction. The positive electrode collector plate 42a and the negative electrode collector plate 44a are respectively joined to a positive electrode active substance layer non-formation section 52a (i.e. exposed portion of the positive electrode collector 52 at which the positive electrode active substance layer 54 is not formed) and a negative electrode active substance layer non-formation section 62a (i.e. exposed portion of the negative electrode collector 62 at which the negative electrode active substance layer 64 is not formed) that are formed so as to protrude outward from both edges of the wound electrode body 20 in the winding axis direction thereof (sheet width direction perpendicular to the longitudinal direction).

For example, an aluminum foil or the like can be used as the positive electrode current collector 52 that constitutes the positive electrode sheet 50. The positive electrode active substance layer 54 contains the positive electrode material according to the present embodiment described above, which is a material containing a positive electrode active substance. In addition, the positive electrode active substance layer 54 may further contain an electrically conductive material, a binder, and the like. Carbon black such as acetylene black (AB) or other carbon materials (graphite or the like) can be advantageously used as the electrically conductive material. For example, poly(vinylidene fluoride) (PVDF) or the like can be used as the binder.

For example, a copper foil or the like can be used as the negative electrode current collector 62 that constitutes the negative electrode sheet 60. The negative electrode active substance layer 64 contains a negative electrode active substance. For example, a carbon material such as graphite, hard carbon or soft carbon can be used as the negative electrode active substance. The negative electrode active substance layer 64 may further contain a binder, a thickening agent, and the like. For example, a styrene-butadiene rubber (SBR) or the like can be used as the binder. For example, carboxymethyl cellulose (CMC) or the like can be used as the thickening agent.

A variety of porous sheets similar to those used in conventional lithium secondary batteries can be used as the separator 70, and examples thereof include porous resin sheets including resins such as polyethylene (PE) and polypropylene (PP). This type of porous resin sheet may have a single layer structure or a multilayer structure having two or more layers (for example, a three layer structure obtained by laminating a PP layer on both surfaces of a PE layer). A heat-resistant layer (HRL) may be provided on the separator 70.

The non-aqueous electrolyte solution can be one similar to those used in conventional lithium secondary batteries, and an electrolyte solution obtained by incorporating a supporting electrolyte in an organic solvent (a non-aqueous solvent) can typically be used. Aprotic solvents such as carbonates, esters and ethers can be used as the non-aqueous solvent. Of these, carbonates such as ethylene carbonate (EC), diethyl carbonate (DEC), dimethyl carbonate (DMC) and ethyl methyl carbonate (EMC) can be advantageously used. In addition, fluorine-based solvents, such as fluorinated carbonates such as monofluoroethylene carbonate (MFEC), difluoroethylene carbonate (DFEC), monofluoromethyldifluoromethyl carbonate (F-DMC) and trifluorodimethyl carbonate (TFDMC) can be advantageously used. It is possible to use one such non-aqueous solvent in isolation or an appropriate combination of two or more types thereof. Lithium salts such as $LiPF_6$, $LiBF_4$ and lithium bis(fluorosulfonyl)imide (LiFSI) can be advantageously used as the supporting electrolyte. The concentration of the supporting electrolyte is desirably at least 0.7 mol/L and at most 1.3 mol/L.

It should be noted that the non-aqueous electrolyte solution may contain components other than the non-aqueous solvent and supporting electrolyte mentioned above, for example, additives such as gas-generating agents, film-forming agents, dispersing agents and thickening agents, as long as the advantageous effect of the present disclosure is not significantly impaired.

The lithium secondary battery 100 can be used in a variety of applications. Examples of desired applications include motive power sources mounted to vehicles such as plug-in hybrid vehicles (PHV), hybrid vehicles (HV) and electric vehicles (EV). The lithium secondary battery 100 can be used in the form of a battery pack in which a plurality of lithium secondary batteries are electrically connected to each other.

An explanation has been given above of an angular lithium secondary battery provided with a flat wound electrode body. However, the positive electrode material according to the present embodiment can be used in a variety of other types of lithium secondary battery in accordance with publicly known methods. For example, it is possible to construct a lithium secondary battery provided with a stacked-type electrode body using the positive electrode material according to the present embodiment. In addition, it is possible to construct a cylindrical lithium secondary battery, a laminate-type lithium secondary battery, and the like, using the positive electrode material according to the present embodiment.

In addition, it is possible to construct an all solid state lithium secondary battery using the positive electrode material according to the present embodiment in accordance with a publicly known method using a solid electrolyte instead of a non-aqueous electrolyte solution.

In addition, a secondary battery other than a lithium secondary battery can be constructed according to a publicly known method using the positive electrode material according to the present embodiment.

Explanations will now be given of examples relating to the present disclosure, but the present disclosure is not intended to be limited to these examples.

Example 1

Production of Positive Electrode Material First, $LiNi_{1/3}Co_{1/3}Mn_{1/3}O_2$ particles having a layered structure were produced as positive electrode active substances in accordance with a conventional method.

Specifically, sulfates of Ni, Co and Mn were dissolved in water at a Ni:Co:Mn molar ratio of 1:1:1. By neutralizing this solution through addition of NaOH, a composite hydroxide containing Ni, Co and Mn was precipitated as a precursor of a positive electrode active substance. The obtained composite hydroxide and lithium carbonate were mixed at a molar ratio of 1:1. $LiNi_{1/3}Co_{1/3}Mn_{1/3}O_2$ particles having a layered structure were obtained by firing this mixture for 15 hours at a temperature of 800° C. The average particle diameter ($D_{50}$) of these $LiNi_{1/3}Co_{1/3}Mn_{1/3}O_2$ particles was measured by means of a laser diffraction scattering method, and found to be 10 μm.

Next, $LiNi_{1/3}Co_{1/3}Mn_{1/3}O_2$ particles having a layered structure were mixed with an aqueous solution of a titanium alkoxide, dried, and then fired at 550° C. (treatment 1). Here, the usage quantity of the titanium alkoxide was such that the amount of Ti was 1 mass % relative to the mass of the $LiNi_{1/3}Co_{1/3}Mn_{1/3}O_2$ particles.

The obtained particles were placed in a mechanochemical apparatus together with a $TiO_2$ powder and subjected to a mechanochemical treatment at 6000 rpm for 30 minutes (treatment 2). The usage quantity of the $TiO_2$ powder was such that the amount of Ti was 1 mass % relative to the mass of the $LiNi_{1/3}Co_{1/3}Mn_{1/3}O_2$ particles.

A positive electrode material in which a Ti-concentrated layer was provided in a surface portion of a positive electrode active substance particle and coatings were provided on the surface was obtained in this way.

Production of Evaluation Lithium Secondary Battery

A slurry for forming a positive electrode active substance layer, having a solid content concentration of 56 mass % was prepared by mixing the thus produced positive electrode material, acetylene black (AB) as an electrically conductive material and poly(vinylidene fluoride) (PVDF) as a binder at a positive electrode material:AB:PVDF mass ratio of 80:8:2, and mixing in N-methylpyrrolidone (NMP) using a planetary mixer. A positive electrode sheet was produced by coating this slurry on both surfaces of an aluminum foil using a die coater, drying and pressing the resultant.

In addition, a slurry for forming a negative electrode active substance layer was prepared by mixing natural graphite (C) as a negative electrode active substance, a styrene-butadiene rubber (SBR) as a binder and carboxymethyl cellulose (CMC) as a thickening agent in ion exchanged water at a C:SBR:CMC mass ratio of 98:1:1. A negative electrode sheet was produced by coating this slurry on both surfaces of a copper foil, drying and pressing the resultant.

In addition, two separator sheets (porous polyolefin sheets) were prepared.

The prepared positive electrode sheet and negative electrode sheet and the two prepared separator sheets were overlaid and wound, thereby preparing a wound electrode body. Electrode terminals were attached to the positive electrode sheet and negative electrode sheet of the produced wound electrode body by welding, and the welded body was housed in a battery case having an injection port.

Next, a non-aqueous electrolyte solution was poured into the battery case from the injection port, and the injection port was then tightly sealed. It should be noted that a non-aqueous electrolyte solution obtained by dissolving $LiPF_6$ as a supporting electrolyte at a concentration of 1.0 mol/L in a mixed solvent containing ethylene carbonate (EC), ethyl methyl carbonate (EMC) and dimethyl carbonate (DMC) at a volume ratio of 1:1:1 was used as the non-aqueous electrolyte solution.

An evaluation lithium secondary battery of Example 1 was obtained in this way.

Comparative Example 1

An evaluation lithium secondary battery was produced in the same way as in Example 1, except that the $LiNi_{1/3}Co_{1/3}Mn_{1/3}O_2$ particles having a layered structure produced in Example 1 were used without modification as the positive electrode material.

Comparative Examples 2 to 13

Positive electrode materials having only coatings were obtained in the same way as in Example 1, except that treatment 1 was not carried out and $LiNi_{1/3}Co_{1/3}Mn_{1/3}O_2$ particles were subjected to a mechanochemical treatment together with the titanium oxides or lithium-titanium composite oxides shown in Table 1 as treatment 2. Next, evaluation lithium secondary batteries were produced in the same way as in Example 1, except that these positive electrode materials were used.

Comparative Example 14

A positive electrode material having only a Ti-concentrated layer was obtained in the same way as in Example 1, except that treatment 2 was not carried out and only treatment 1 was carried out. Next, an evaluation lithium secondary battery was produced in the same way as in Example 1, except that this positive electrode material was used.

Comparative Example 15

Sulfates of Ni, Co and Mn were dissolved in water at a Ni:Co:Mn molar ratio of 1:1:1. Titanium sulfate was then added and dissolved. Here, the usage quantity of the titanium sulfate was such that the amount of Ti was 2 mass % relative to the mass of the positive electrode active substance. By neutralizing this solution through addition of NaOH, a composite hydroxide containing Ni, Co, Mn and Ti was precipitated as a precursor of a positive electrode active substance. The obtained composite hydroxide and lithium carbonate were mixed at a molar ratio of 1:1. $LiNi_{1/3}Co_{1/3}Mn_{1/3}O_2$ particles in which Ti uniformly solid-solved throughout in the particles were obtained by firing this mixture for 15 hours at a temperature of 800° C.

An evaluation lithium secondary battery was produced in the same way as in Example 1, except that these particles were used without modification as a positive electrode material.

Examples 2 to 13

Positive electrode materials were produced in the same way as in Example 1, except that the titanium oxides and/or lithium-titanium composite oxides shown in Table 1 were used in treatment 2. Next, evaluation lithium secondary batteries were produced in the same way as in Example 1, except that these positive electrode materials were used.

It should be noted that both a titanium oxide and a lithium-titanium composite oxide were used in Example 13.

Examples 14 to 22

Evaluation lithium secondary batteries were produced in the same way as in Example 1, except that the usage quantity of the titanium alkoxide in treatment 1 was altered and $Ti_3O_5$ was used in treatment 2.

Examples 23 to 30

Evaluation lithium secondary batteries were produced in the same way as in Example 1, except that the usage quantity of the titanium alkoxide in treatment 1 was altered, $Ti_3O_5$ was used in treatment 2, and the usage quantity thereof was altered.

Analysis of Positive Electrode Materials Cross sections of the positive electrode materials produced in the examples and comparative examples were observed using a STEM. As a result, it could be confirmed that coatings were formed at the surface of the $LiNi_{1/3}Co_{1/3}Mn_{1/3}O_2$ particles in Comparative Examples 2 to 13. It could be confirmed that a Ti-concentrated layer was formed in a surface portion of the $LiNi_{1/3}Co_{1/3}Mn_{1/3}O_2$ particles in Comparative Example 14, and it could be confirmed that Ti was present at the same concentration throughout the $LiNi_{1/3}Co_{1/3}Mn_{1/3}O_2$ particles in Comparative Example 15. It could be confirmed that a Ti-concentrated layer was formed in a surface portion of the $LiNi_{1/3}Co_{1/3}Mn_{1/3}O_2$ particles and coatings were formed on the surface of the particles in Examples 1 to 13.

In addition, in cases where a Ti-concentrated layer was formed, the thickness thereof was determined, and in the positive electrode materials produced in the examples and comparative examples, the ratio (mass %) of the total amount of Ti contained in the titanium-containing compound of the coatings and Ti contained in the Ti-concentrated layer relative to the mass of the positive electrode active substance was determined by TEM-EDX. The results are shown in Tables 1 and 2.

Activation and Measurement of Initial Capacity

Each produced evaluation lithium secondary battery was placed in an environment at a temperature of 25° C. Activation (initial charging) was carried out using a constant current-constant voltage method, which included subjecting each evaluation lithium secondary battery to constant current charging at a current of 1/3 C to a voltage of 4.2 V, and then constant voltage charging until the current reached 1/50 C, thereby achieving a fully charged state. Next, each evaluation lithium secondary battery was subjected to constant current discharging at a current of 1/3 C to a voltage of 3.0 V. At this point, the discharge capacity was measured and thus the initial capacity was determined.

Measurement of Low Temperature Resistance

Each activated evaluation lithium secondary battery was adjusted to a voltage of 3.70 V (open circuit voltage) and then left in an environment at −25° C. Each evaluation lithium secondary battery was discharged for 8 seconds at a current of 20 C. The voltage decrease amount ΔV at this point was determined, and the battery resistance was calculated using the current and this ΔV value. With the resistance of an evaluation lithium secondary battery obtained using the positive electrode of Comparative Example 1 taken to be 1.00, the ratios of the resistance of evaluation lithium secondary batteries obtained using the positive electrodes of other comparative examples and examples were determined. The results are shown in Tables 1 and 2.

Evaluation of High Temperature Cycle Characteristics

Each activated evaluation lithium secondary battery was left in an environment at 60° C., and a cycle including constant current charging at a current of 10 C to a voltage of 4.2 V and then constant current discharging at a current of 10 C to a voltage of 3.3 V was repeated 500 times. The discharge capacity after the 500th cycle was determined using the same method as that used for initial capacity. As an indicator of high temperature cycle characteristics, capacity retention rate (%) was determined from (discharge capacity after 500th charging/initial capacity)×100. The results are shown in Tables 1 and 2.

Evaluation of High Voltage Operation

Each activated evaluation lithium secondary battery was left in an environment at 25° C., and a cycle including constant current charging at a current of 1/3 C to a voltage of 4.6 V and then constant current discharging at a current of 1/3 C to a voltage of 3 V was repeated 10 times. The battery resistance after the 10th cycle was measured using the same method as that described above. With the resistance of an evaluation lithium secondary battery obtained using the positive electrode of Comparative Example 1 taken to be 1.00, the ratios of the resistance of evaluation lithium secondary batteries obtained using the positive electrodes of other comparative examples and examples were determined. The results are shown in Tables 1 and 2.

TABLE 1

| | Composition of coating | Thickness (nm) of Ti-concentrated layer | Total amount of Ti relative to positive electrode active substance (mass %) | Low temperature resistance ratio | Capacity retention rate (%) | Resistance ratio after high voltage operation |
|---|---|---|---|---|---|---|
| Comparative Example 1 | None | None | 0 | 1.00 | 40 | 1.00 |
| Comparative Example 2 | $TiO_2$ | None | 1 | 0.95 | 50 | 1.14 |

TABLE 1-continued

| | Composition of coating | Thickness (nm) of Ti-concentrated layer | Total amount of Ti relative to positive electrode active substance (mass %) | Low temperature resistance ratio | Capacity retention rate (%) | Resistance ratio after high voltage operation |
|---|---|---|---|---|---|---|
| Comparative Example 3 | $Ti_3O_5$ | None | 1 | 0.94 | 51 | 1.13 |
| Comparative Example 4 | $Ti_4O_7$ | None | 1 | 0.96 | 52 | 1.15 |
| Comparative Example 5 | $Ti_5O_9$ | None | 1 | 0.97 | 52 | 1.16 |
| Comparative Example 6 | LTO (Li/Ti = 0.1) | None | 1 | 0.92 | 50 | 1.10 |
| Comparative Example 7 | LTO (Li/Ti = 0.8) | None | 1 | 0.95 | 50 | 1.14 |
| Comparative Example 8 | LTO (Li/Ti = 0.9) | None | 1 | 0.95 | 53 | 1.14 |
| Comparative Example 9 | LTO (Li/Ti = 1) | None | 1 | 0.98 | 55 | 1.18 |
| Comparative Example 10 | LTO (Li/Ti = 2) | None | 1 | 0.96 | 54 | 1.15 |
| Comparative Example 11 | LTO (Li/Ti = 2.5) | None | 1 | 0.94 | 56 | 1.13 |
| Comparative Example 12 | LTO (Li/Ti = 2.6) | None | 1 | 0.93 | 53 | 1.12 |
| Comparative Example 13 | LTO (Li/Ti = 3) | None | 1 | 0.96 | 57 | 1.15 |
| Comparative Example 14 | None | 2 | 1 | 0.89 | 63 | 1.07 |
| Comparative Example 15 | $TiO_2$ | (Ti contained uniformly) | 2 | 0.90 | 64 | 1.08 |
| Example 1 | $TiO_2$ | 2 | 2 | 0.61 | 92 | 0.73 |
| Example 2 | $Ti_3O_5$ | 2 | 2 | 0.63 | 91 | 0.76 |
| Example 3 | $Ti_4O_7$ | 2 | 2 | 0.65 | 90 | 0.78 |
| Example 4 | $Ti_5O_9$ | 2 | 2 | 0.63 | 89 | 0.76 |
| Example 5 | LTO (Li/Ti = 0.1) | 2 | 2 | 0.63 | 91 | 0.76 |
| Example 6 | LTO (Li/Ti = 0.8) | 2 | 2 | 0.62 | 93 | 0.74 |
| Example 7 | LTO (Li/Ti = 0.9) | 2 | 2 | 0.65 | 92 | 0.77 |
| Example 8 | LTO (Li/Ti = 1) | 2 | 2 | 0.63 | 91 | 0.76 |
| Example 9 | LTO (Li/Ti = 2) | 2 | 2 | 0.62 | 94 | 0.74 |
| Example 10 | LTO (Li/Ti = 2.5) | 2 | 2 | 0.61 | 93 | 0.73 |
| Example 11 | LTO (Li/Ti = 2.6) | 2 | 2 | 0.63 | 91 | 0.76 |
| Example 12 | LTO (Li/Ti = 3) | 2 | 2 | 0.64 | 93 | 0.77 |
| Example 13 | $TiO_2$/LTO (Li/Ti = 1) | 2 | 2 | 0.59 | 95 | 0.71 |

* "LTO" denotes a lithium-titanium composite oxide, and the Li/Ti ratio is the atom number ratio.

TABLE 2

| | Composition of coating | Thickness (nm) of Ti-concentrated layer | Total amount of Ti relative to positive electrode active substance (mass %) | Low temperature resistance ratio | Capacity retention rate (%) | Resistance ratio after high voltage operation |
|---|---|---|---|---|---|---|
| Example 14 | $Ti_3O_5$ | 0.4 | 0.1 | 0.71 | 85 | 0.83 |
| Example 15 | $Ti_3O_5$ | 0.5 | 0.1 | 0.63 | 94 | 0.76 |
| Example 16 | $Ti_3O_5$ | 1 | 0.5 | 0.64 | 91 | 0.77 |
| Example 17 | $Ti_3O_5$ | 5 | 1 | 0.62 | 93 | 0.74 |
| Example 18 | $Ti_3O_5$ | 10 | 2 | 0.61 | 94 | 0.75 |
| Example 19 | $Ti_3O_5$ | 30 | 3 | 0.66 | 94 | 0.73 |
| Example 20 | $Ti_3O_5$ | 50 | 5 | 0.62 | 91 | 0.75 |
| Example 21 | $Ti_3O_5$ | 100 | 10 | 0.66 | 92 | 0.74 |
| Example 22 | $Ti_3O_5$ | 110 | 13 | 0.73 | 86 | 0.84 |
| Example 23 | $Ti_3O_5$ | 0.5 | 0.005 | 0.72 | 86 | 0.83 |
| Example 24 | $Ti_3O_5$ | 0.5 | 0.01 | 0.64 | 91 | 0.74 |
| Example 25 | $Ti_3O_5$ | 0.5 | 0.1 | 0.63 | 92 | 0.73 |
| Example 26 | $Ti_3O_5$ | 0.5 | 1 | 0.61 | 94 | 0.75 |
| Example 27 | $Ti_3O_5$ | 0.5 | 5 | 0.64 | 90 | 0.72 |

TABLE 2-continued

|  | Composition of coating | Thickness (nm) of Ti-concentrated layer | Total amount of Ti relative to positive electrode active substance (mass %) | Low temperature resistance ratio | Capacity retention rate (%) | Resistance ratio after high voltage operation |
|---|---|---|---|---|---|---|
| Example 28 | $Ti_3O_5$ | 0.5 | 10 | 0.62 | 93 | 0.76 |
| Example 29 | $Ti_3O_5$ | 0.5 | 15 | 0.66 | 93 | 0.73 |
| Example 30 | $Ti_3O_5$ | 0.5 | 20 | 0.73 | 87 | 0.85 |

From the results in Tables 1 and 2, it is understood that by using a positive electrode material in which a Ti-concentrated layer was provided in a surface portion of a positive electrode active substance particle and coatings were provided on the surface, it is possible to obtain a lithium secondary battery having excellent low temperature output characteristics, excellent high temperature cycle characteristics and excellent durability against high voltage.

In addition, from the results of Example 2 and Examples 14 to 22, it is understood that in cases where the thickness of the Ti-concentrated layer is at least 0.5 nm and at most 100 nm, the effects of improving low temperature output characteristics, improving high temperature cycle characteristics and improving durability against high voltage are particularly enhanced.

In addition, from the results of Example 2 and Examples 23 to 30, it is understood that in cases where the total amount of Ti contained in the titanium-containing compound of the coatings and Ti contained in the Ti-concentrated layer is at least 0.01 mass % and at most 15 mass % relative to the mass of the positive electrode active substance particle, the effects of improving low temperature output characteristics, improving high temperature cycle characteristics and improving durability against high voltage are particularly enhanced.

Comparative Examples 16 to 21

Evaluation lithium secondary batteries were produced in the same way as in Example 1, except that the positive electrode active substances shown in Table 3 were used without modification as positive electrode materials.

Examples 31 to 36

Positive electrode materials in which a Ti-concentrated layer was provided in a surface portion of a positive electrode active substance particle and coatings were provided on the surface were produced in the same way as in Example 16, except that the positive electrode active substances shown in Table 3 were used. Evaluation lithium secondary batteries were produced in the same way as in Example 1, except that these positive electrode materials were used.

Evaluation of Characteristics

The positive electrode materials used in Comparative Examples 16 to 21 and Examples 31 to 36 were analyzed in the same way as described above. Furthermore, the evaluation lithium secondary batteries of Comparative Examples 16 to 21 and Examples 31 to 36 were subjected to activation, initial capacity measurements, low temperature resistance measurements, high temperature cycle characteristics evaluation, and high voltage operation evaluations in the same way as described above.

For the low temperature resistance measurements and high voltage operation evaluations in experimental examples carried out using active substances having the same composition, the resistance of an example was determined as a ratio relative to a value of 1 for the resistance value of a comparative example. The evaluation results are shown in Table 3.

TABLE 3

|  | Positive electrode active substance composition | Composition of coating | Thickness (nm) of Ti-concentrated layer | Total amount of Ti relative to positive electrode active substance (mass %) | Low temperature resistance ratio | Capacity retention rate (%) | Resistance ratio after high voltage operation |
|---|---|---|---|---|---|---|---|
| Comparative Example 16 | $LiCoO_2$ | None | None | 0 | 1 | 41 | 1 |
| Example 31 | $LiCoO_2$ | $Ti_3O_5$ | 1 | 0.5 | 0.64 | 93 | 0.74 |
| Comparative Example 17 | $LiMn_2O_4$ | None | None | 0 | 1 | 42 | 1 |
| Example 32 | $LiMn2O4$ | $Ti_3O_5$ | 1 | 0.5 | 0.63 | 92 | 0.73 |
| Comparative Example 18 | $LiNiO_2$ | None | None | 0 | 1 | 45 | 1 |
| Example 33 | $LiNiO_2$ | $Ti_3O_5$ | 1 | 0.5 | 0.65 | 93 | 0.75 |
| Comparative Example 19 | $LiNi_{0.5}Mn_{1.5}O_4$ | None | None | 0 | 1 | 43 | 1 |
| Example 34 | $LiNi_{0.5}Mn_{1.5}O_4$ | $Ti_3O_5$ | 1 | 0.5 | 0.62 | 95 | 0.76 |
| Comparative Example 20 | $LiNi_{0.8}Co_{0.15}Al_{0.05}O_2$ | None | None | 0 | 1 | 45 | 1 |
| Example 35 | $LiNi_{0.8}Co_{0.15}Al_{0.15}O_2$ | $Ti_3O_5$ | 1 | 0.5 | 0.63 | 92 | 0.74 |
| Comparative Example 21 | $LiFePO_4$ | None | None | 0 | 1 | 42 | 1 |
| Example 36 | $LiFePO_4$ | $Ti_3O_5$ | 1 | 0.5 | 0.65 | 92 | 0.72 |

From the results in Table 3, it is understood that by comparing Comparative Examples 16 to 21 and Examples 31 to 36, respectively, the effects of improving low temperature output characteristics, improving high temperature cycle characteristics and improving durability against high voltage can be achieved regardless of the composition and crystal structure of the positive electrode active substance.

From the results above, it is understood that by using the positive electrode material of a secondary battery according to the present embodiment, it is possible to impart a secondary battery with excellent low temperature output characteristics, excellent high temperature cycle characteristics and excellent durability against high voltage.

Specific examples of the present disclosure have been explained in detail above, but these are merely examples, and do not limit the scope of the claims. The features disclosed in the claims also encompass modes obtained by variously modifying or altering the specific examples shown above.

What is claimed is:

1. A positive electrode material of a secondary battery, the positive electrode material comprising:
    a positive electrode active substance particle having an outermost region layer that includes an outermost surface of the positive electrode active substance particle, the outermost region layer having a thickness of at least 0.5 nm to at most 100 nm as measured from the outermost surface, wherein the outermost region layer comprises a titanium (Ti) concentrated layer having a higher Ti concentration than a Ti concentration at a depth of 500 nm from the outermost surface of the positive electrode active substance particle; and
    a coating containing a titanium-containing compound separate from and on the Ti concentrated layer of the outermost region layer of the positive electrode active substance particle, wherein
    a total amount of Ti contained in the titanium-containing compound of the coating and Ti contained in the outermost region layer having the higher Ti concentration is at least 0.01 mass % and at most 15 mass % relative to a mass of the positive electrode active substance particle,
    Ti is in solid solution in the positive electrode active substance particle,
    the coating is in a form of islands scattered over the outermost surface of the positive electrode active substance particle and does not fully cover the outermost surface, and
    the titanium-containing compound in the coating is at least one compound selected from the group consisting of $TiO_2$, $Ti_nO_{2n-1}$, wherein n is an integer of 3 or more, and oxides containing Li and Ti.

2. A secondary battery comprising:
    a positive electrode;
    a negative electrode; and
    an electrolyte, wherein
    the positive electrode contains the positive electrode material of a secondary battery according to claim 1.

3. The positive electrode material of a secondary battery according to claim 1, wherein the coating has a thickness of at least 0.1 nm and at most 100 nm.

4. The positive electrode material of a secondary battery according to claim 1, wherein the coating is formed by causing a constituent material of the coating to adhere to the outermost surface of the positive electrode active substance particle by a mechanochemical treatment or a barrel sputtering treatment.

* * * * *